UNITED STATES PATENT OFFICE.

PETER C. D. CASTLE, OF BEBINGTON, ENGLAND.

MANUFACTURE OF ARTIFICIAL MOTHER-OF-PEARL.

No. 809,909. Specification of Letters Patent. Patented Jan. 9, 1906.

Application filed August 24, 1903. Serial No. 170,646.

*To all whom it may concern:*

Be it known that I, PETER CAMERON DOUGLAS CASTLE, managing director of public company, a subject of the King of Great Britain, residing at Bebington, in the county of Chester, in the Kingdom of England, (whose post-office address is The Fox Coverts, Bebington aforesaid,) have invented certain new and useful Improvements in the Manufacture of Artificial Mother-of-Pearl, (for which application has been made in Great Britain, No. 3,206, dated February 10, 1903,) of which the following is a specification.

This invention has for its object the manufacture of artificial mother-of-pearl having the appearance of the natural object, while being much cheaper in cost.

In carrying out my invention I take the following ingredients: the dust of the inner portion of oyster-shells or other shells of the same pearly nature, zinc-white, mica-dust, gum-sandarac, and a solution of bleached shellac. I first take the inside shell of the oyster, pearl-oyster, or other like shell and thoroughly pulverize it to a fine state of division, wash it to free it from soluble salts, and then thoroughly dry it. Mica-dust is similarly pulverized very fine—say to the consistency of the finest flour—after which it is mixed with the oyster-shell dust and laid out on suitable trays to dry. The two powders when thoroughly dry are passed through very fine silk sieves in order to eliminate every particle of grit, and the fine material is thoroughly mixed with the solution of gum-sandarac. One-half of the quantity of gum-sandarac employed is used dry in the form of a fine powder, while the remainder is dissolved in spirit with the shellac, the whole being mixed in the powders above mentioned. The composition is then left for a few hours till much of the spirit is evaporated. It is then put through a pug-mill under very considerable pressure and then dried at a gentle heat. The material is again pulverized until it will pass through a fine silk sieve, the finer the better, and is then mixed with finely-divided zinc-white. The entire mixture is now damped with a little water and about an hour after is pressed in a powerful press, preferably with about fifteen hundredweight to the square inch in molds. These molds and their plungers are jacketed and are provided with inlets or outlets for steam or water, as the case may be. They are connected with a steam and water supply, with suitable cocks to turn either on. The molds and their plungers are first supplied with steam and are kept under pressure until the entire temperature has risen to about 100° Fahrenheit. The steam is now cut off and cold water admitted to the jackets of both the plunger and the mold and the material allowed to cool under pressure. The article is now ready for use and can be cut up into slabs or carved and polished in any desirable manner or made into such things as panels, finger-plates, fruit-knife handles, umbrella-handles, or thin sheets for inlaying. The quantities which I have found most desirable are as follows: three pounds of oyster-shell dust, one ounce of zinc-white, four ounces of mica-dust, four ounces of gum-sandarac, and one-half pint of white-shellac solution, the said solution being of the strength of one ounce of finest white shellac to ten ounces of alcohol.

In thus describing my invention I would point out that for mica-dust an equivalent quantity of oyster-shell dust, or even silicate of magnesia, can be substituted, that in place of zinc-white other fine white pigments may be substituted, or where the material has to be colored other coloring-matter can be used instead.

I declare that what I claim is—

1. As a new article of manufacture a hard block of artificial substance formed of the pearly matter of shells, cementitious matter and a soft pulverulent alkaline-earth silicate pressed into a hard block.

2. As a new article of manufacture a substance formed of finely-powdered pearly matter of shells, cementitious matter and finely-ground mica pressed into a hard mass.

3. As a new article of manufacture, an artificial substance composed of finely-powdered pearl-shell and gum-sandarac.

4. As a new article of manufacture an artificial substance formed of finely-powdered pearly matter, gum-sandarac and a finely-powdered mineral silicate having a saponaceous feel.

5. The process of manufacturing artificial mother-of-pearl, which consists in mixing pulverized pearly matter of shells, finely-ground white mineral matter, gum-sandarac, and a solvent; and subjecting the mass thus produced to pressure in the presence of heat.

6. The improved process of manufacturing artificial mother-of-pearl, which consists in pulverizing the solid materials which enter into the composition and mixing them with gum-sandarac and a solvent; pressing the mass thus produced in the presence of heat; and finally cooling the mass while the pressure is maintained thereon.

In witness whereof I have hereunto signed my name, this 13th day of August, 1903, in the presence of two subscribing witnesses.

P. C. D. CASTLE.

Witnesses:
H. P. SHOOBRIDGE,
JOHN McLACHLAN.